Nov. 22, 1966 — H. E. JACOBY — 3,286,763
RECOVERING HEAT FROM A BLOW EVAPORATOR FOR USE IN A SURFACE EVAPORATOR
Filed Oct. 19, 1964 — 5 Sheets-Sheet 1

INVENTOR.
HAROLD E. JACOBY
BY Albert M. Parker
ATTORNEY.

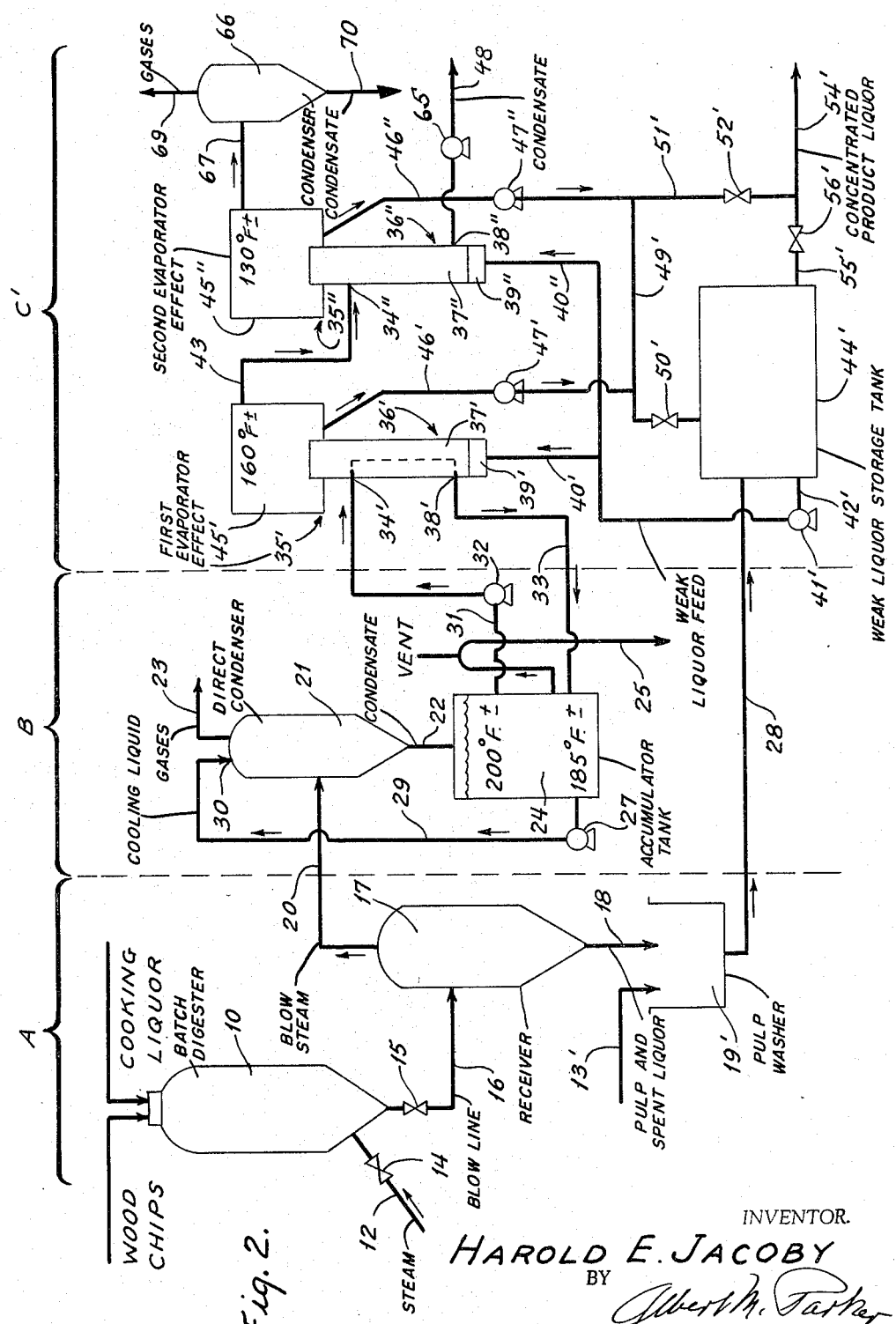

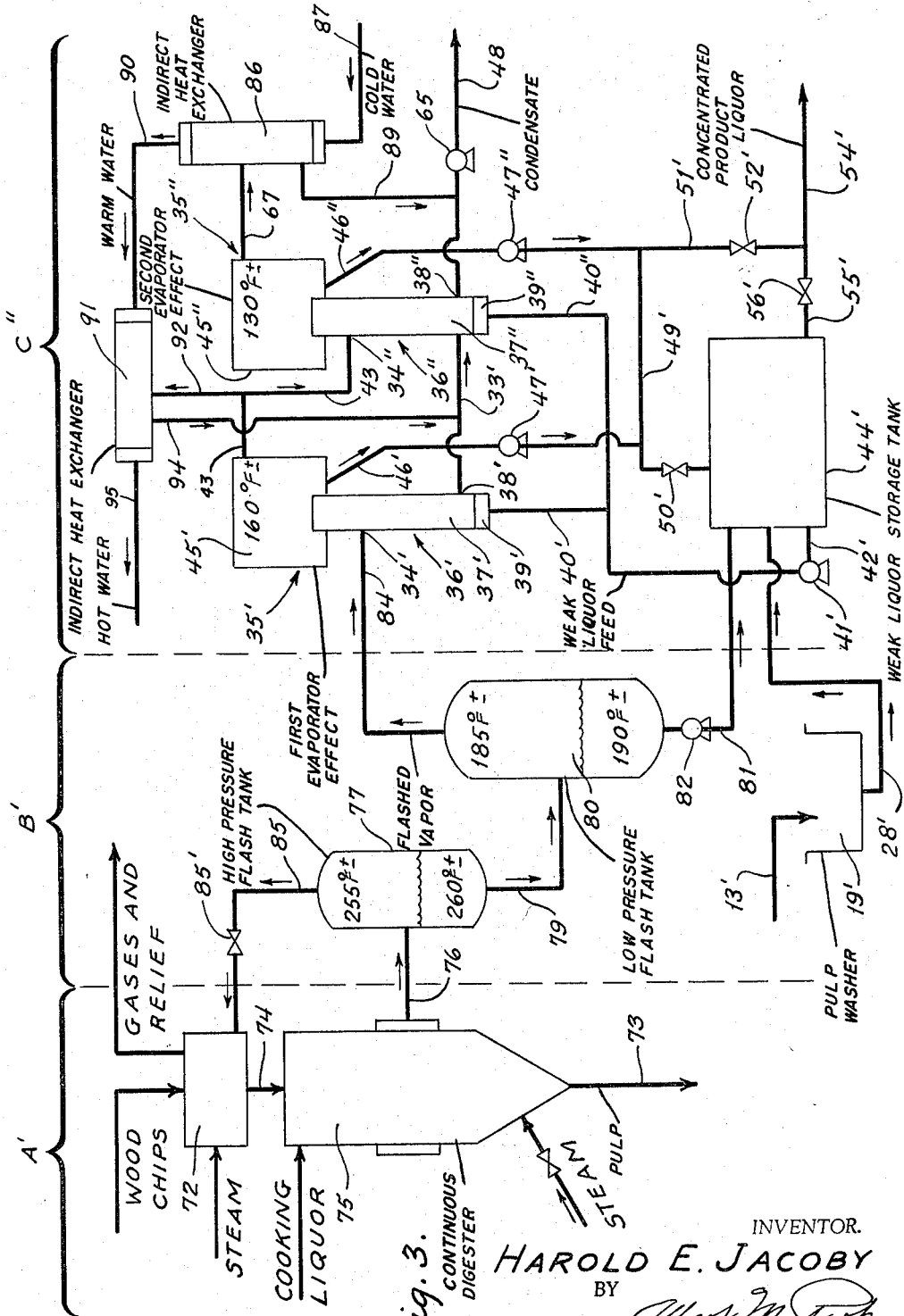

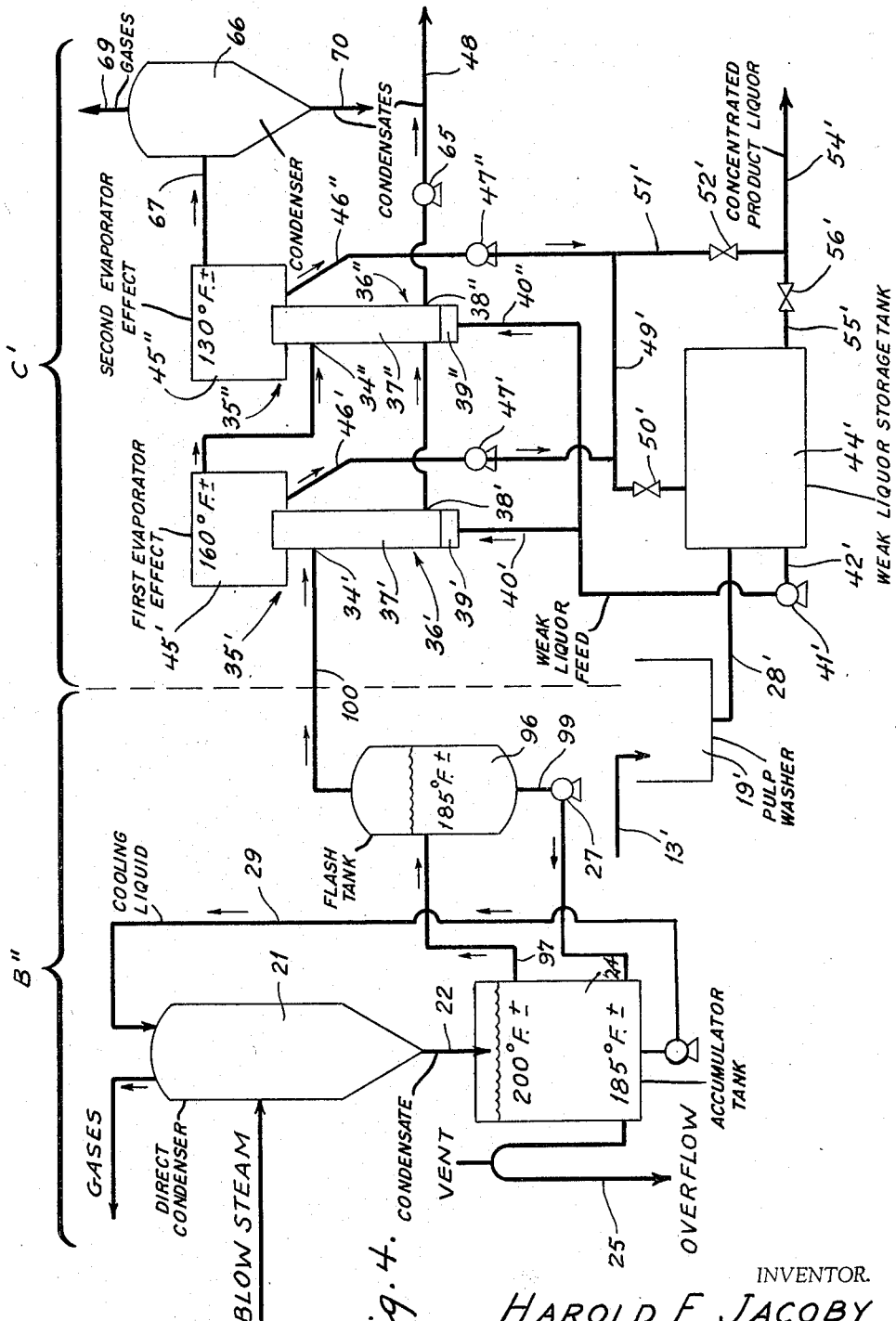

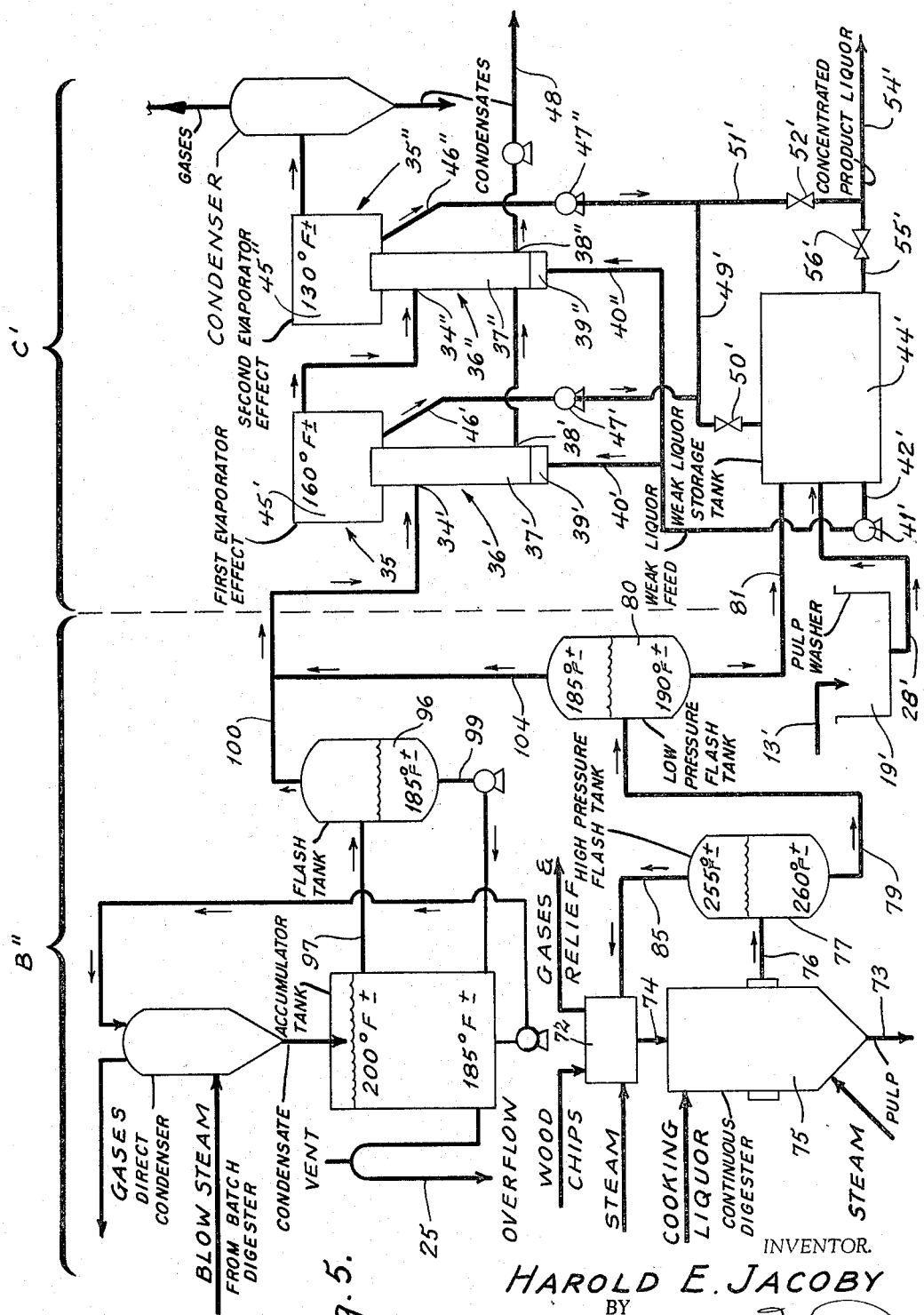

United States Patent Office 3,286,763
Patented Nov. 22, 1966

3,286,763
RECOVERING HEAT FROM A BLOW EVAPORATOR FOR USE IN A SURFACE EVAPORATOR
Harold E. Jacoby, % Jacoby Process Equipment Co., Inc., 97 Shepherd Lane, Roslyn Heights, N.Y.
Filed Oct. 19, 1964, Ser. No. 404,727
15 Claims. (Cl. 159—2)

This application is a continuation-in-part of application Ser. No. 325,959, filed November 26, 1963, now abandoned.

This invention relates to a wood pulp digester blow heat reclaiming system and method, and more particularly relates to an improved system and method for making use of such blow heat for evaporating a process liquor resulting from the cooking of wood chips in such a digester.

In the manufacture of wood pulp by a conventional batch process, wood chips are introduced into a pressure vessel to which an aqueous chemical solution, commonly referred to as cooking liquor, is added. The vessel is then sealed and heat is applied thereto as by inroducing steam under pressure into the vessel. Alternatively, the vessel may be heated indirectly by means of heat exchange from a heating fluid such as steam. After a desired period of time, the aqueous solution will have reduced the wood chips to a pulp, the reaction then being completed.

Following this, the discharge valve of the vessel is opened, thereby releasing the pulp and residual cooking liquor which are thus "blown" under pressure from the vessel to a receiver such as a tank. Upon such release of pressure from the vessel and the discharge of its contents to the receiver, substantial quantities of water and other vapors are released by "flashing," i.e. converting sensible heat to latent heat of vaporization. The present invention relates to the novel treatment of such thus released vapors whereby to recover a substantial amount of the heat contained in such vapors, and to put such heat to valuable use. Among such uses of the recovered heat is the evaporation of a process liquor of the system and/or the utilization of at least a part of such heat to raise the temperaure of a further process fluid, such as water.

Similarly, in continuous digester systems, heat is released by continuous flashing of the digester conents—either liquor or pulp or both. Flashed vapors are thus continuously available from such system and may be used as described herein.

There are disclosed herein five embodiments of heat reclaiming systems in accordance with the invention, shown in FIGS. 1–5, inclusive, respectively. In all of such embodiments an evaporator is interposed between the digester heat release system and the normal heat exchanger heretofore employed to recover said heat by raising the temperature of a further fluid, such as water. The system of the invention, therefore, eliminates or materially reduces the need for evaporating process liquor and/or heating such further fluids such as water by means of steam generated directly from fuel in the powerhouse.

The invention has among its objects the provision of a novel heat reclaiming system and of a novel method of reclaiming heat from the flashed vapors available in a wood pulp plant such as those produced at a pulp digester.

A further object of the invention is to employ the accumulated heat from the flashed vapors produced by a pulp digester as a means of accomplishing evaporation of a process liquid in the wood pulp system, such as spent liquor in the chemical recovery portion of that system.

Another object of the invention is to employ, in a system and a method of the type indicated immediately above, the vapors from a plurality of successive evaporation steps for the progressive heating of a process liquid.

Still a further object of the invention is the provision of a novel heat reclaiming system and a method of reclaiming heat from digesters in a wood pulping process wherein accumulated water, heated by such reclaimed heat, is flashed to vapor under a decreased pressure and the resulting flashed vapors are employed as a source of heat for the evaporation of a process liquid.

Yet another object of the invention is the provision of an improved heat reclaiming system and method of reclaiming heat useable with a wood pulping process whether employing batch or continuous pulp digesters.

Still another object of the invention resides in the provision of an improved heat reclaiming system and method of reclaiming heat in a wood pulp plant employing in combination at least one continuous pulp digester and a plurality of batch type pulp digesters, the reclaimed heat from both types of digesters providing the heat source required for an evaporator employed in the wood pulping system for the evaporation of a process liquid.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a somewhat diagrammatic view of a batch type pulp-cooking system, the figure showing a first embodiment of heat reclaiming system in accordance with the invention applied thereto;

FIG. 2 is a somewhat diagrammatic view of a pulp-cooking system having a heat reclaiming system applied thereto, the system of FIG. 2 differing primarily from that of FIG. 1 by the employment of a multiple effect evaporator rather than a single effect evaporator as shown in FIG. 1;

FIG. 3 is a somewhat diagrammatic view of a pulp-cooking system employing a continuous pulp digester, the multiple effect evaporator there shown being employed as a source of heat for the progressive heating of a further liquid;

Figure 1:
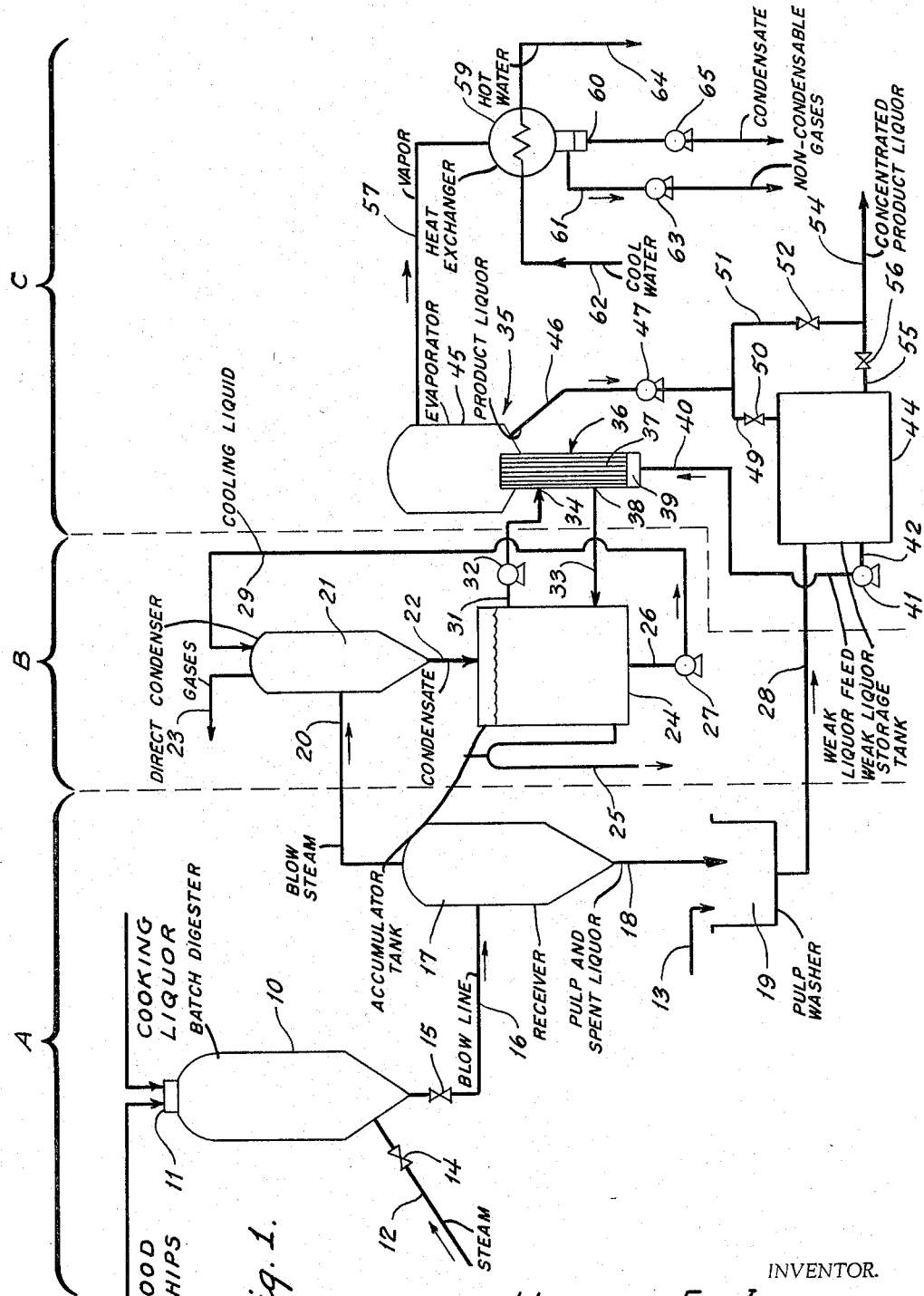

FIG. 4 is a somewhat diagrammatic view of a portion of a fourth embodiment of pulp-cooking system, such system incorporating a heat reclaiming system wherein accumulated water, heated by reclaiming heat, is flashed to a vapor and the resulting vapor is employed as a source of heat for an evaporator for a process liquid; and FIG. 5 is a somewhat diagrammatic view of a pulp-cooking system employing continuous and batch type pulp digesters in combination, reclaimed heat from both types of digesters being employed as the heating medium for an evaporator for a process liquid.

In the embodiment of FIG. 1, the system is shown divided, for ease of reference, into a digester section A, a blow heat accumulator section B, and a blow heat evaporator section C. Section A includes a wood chip digester in the form of a vessel 10 having an upper chip charging port 11 which is shown as being heated by steam from a steam line 12 connected thereto through a control valve 14. The digester operates at a relatively high pressure and temperature, approximately 100 p.s.i. and 350° F. A discharge conduit 16 having a valve 15 interposed therein is connected to the bottom of vessel 10, the conduit 16 leading to an essentially closed tank or vessel 17 which receives the contents of the digester 10 upon the opening of the valve 15 at the end of the digesting process. The pressure and temperature of the thus discharged contents of the vessel 10 are thereby reduced; such contents, as above indicated, are a mixture of digested wood pulp, spent aqueous digesting liquor, and the vapors flashed from such liquor. The solid and liquid contents of such discharged material received in vessel 17 are discharged therefrom through a conduit generally indicated at 18 to a pulp washer 19. Washer 19 is supplied with fresh water by means shown generally as a pipe 13. The washed solid contents of the material in vessel 19 are removed therefrom in a conventional manner, not shown. The liquid contents are discharged from such pulp washer in the form of dilute or weak liquor which is forwarded through a conduit 28 to a storage tank 44 from which it is discharged to be further treated, in a manner to be described.

Vapors from receiver 17 at approximately atmospheric pressure and at a temperature of approximately 212° F. escape therefrom through a conduit 20 which leads to the upper end of a condenser 21 shown in the blow heat accumulator section B. The condenser shown is of the so-called jet type, wherein the vapors intimately contact jets or showers of cooling liquid. It is to be understood, however, that, if desired, the condenser may be of the surface-heating type wherein the vapors and the cooling method are maintained separated from each other. The condensate from the vapors introduced into the condenser, mixed with the cooling liquid, are discharged from the condenser as indicated at 22 into a hot water accumulator tank 24. Such tank is of appreciable depth and, because of the manner of feeding liquids thereinto and removing them therefrom to be described, have the water in the upper zone thereof at a temperature appreciably higher than that of the liquid adjacent to the bottom of the accumulator. Thus in in illustrated system the liquid discharged from the condenser at 22 has a temperature of approximately 200° F., that in the accumulator 24 at and adjacent the top thereof is at substantially the same temperature, that is, 200° F., whereas the temperature of the liquid adjacent to the bottom of the accumulator is 150° F. or higher, but lower than the upper zone of the accumulator. The system and method illustrated in FIG. 1 make novel, efficient use of the heat in the water in accumulator 24 and of the temperature differential between different zones thereof, both to evaporate the spent liquor of the process of the illustrative system and to heat a further fluid such as water, employed either in the same process or elsewhere in the plant.

The condenser 21 and the accumulator tank 24 are provided with conventional appurtenances, two of which are shown in the drawings. Thus the condenser is provided with a means shown diagrammatically at 23 for venting air or other non-condensable gases from the interior thereof to the atmosphere. The accumulator tank 24 is provided with an overflow device 25 in the form of a conduit of inverted U-shape communicating with the tank near the bottom thereof. Device 25 maintains the level of liquid in the tank constant, and does so by discharging cooler liquid from the tank when required.

Cooler liquid is also discharged from the tank 24 through a pipe 26 connected to the bottom of the tank, such pipe leading to a pump 27 and thence by way of a pipe 29 to a port 30 adjacent to the upper end of the condenser 21. As disclosed above, the liquid which is thus introduced into the condenser is at a relatively low temperature, 150° F., for example, and functions as a cooling liquid for the vapors entering the condenser through the conduit 20. Liquid from an upper, hotter level in the tank 24 is discharged therefrom through a pipe 31 leading to a pump 32, by which hot liquid is introduced to the heating surface 37 of the evaporator 35 through port 34 adjacent the upper end of the casing 36 of an evaporator heating surface in the blow heat evaporator section C. Cooled liquid is discharged from a port 38 adjacent the lower end of the casing 36 by way of a pipe 33 which is connected to the tank 24 adjacent the lower end thereof.

Thus the evaporator 35 receives heat from liquid entering it at an elevated temperature, the heating liquid being cooled by transferring a portion of its heat to spent liquor held isolated therefrom in the evaporator which spent liquor boils and is concentrated by this heat transfer. After thus losing a portion of its heat, the heating liquid is returned to the accumulator tank.

In the illustrative embodiment the further liquid is weak or spent liquor which is fed to a weak liquor storage tank 44 from the pulp washer 19 through the above mentioned conduit 28. Such weak liquor is fed from tank 44 through a pipe 42 to a pump 41, the pump discharging the liquor under pressure through a pipe 40 connected to a liquor compartment 39 at the lower end of the casing 36 of the evaporator 35. Evaporator 35 has a tube bundle or other type of heat transfer surface 37 therein through which the liquor introduced into compartment 39 rises and boils at a temperature lower than that of the liquid in the return line 33 while being held separated by the heating surface from the heating liquid introduced into the casing of the evaporator through port 43 and exhausted therefrom through port 38. Partially evaporated and concentrated liquor resulting from the boiling upon emerging from the top of tube bundle 37 collects in the lower end of a dome-like vapor body or vapor release chamber 45 at the upper end of the evaporator. Such partially evaporated liquor is led from the lower end of the vapor body through a pipe 46 to a pump 47, the pump functioning alternatively to forward the liquor to the tank 44 through a pipe 49 and a shut-off valve 50 or through a pipe 51 and a shut-off valve 52 to a discharge pipe 54. To permit such alternative discharge of the liquor, the system is further provided with a shut-off valve 56 which is interposed in a pipe 55 connected to the tank 44 and to the junction of pipes 51 and 54.

The vapors collected in the vapor body 45 of the evaporator are exhausted through a conduit 57 connected to the vapor body adjacent its upper end and thence to a heat exchanger 59 wherein the vapors are condensed. The condensate from said vapors is removed by pump 65 through liquid discharge means 60. Any non-condensable gas is discharged from the heat exchanger being exhausted through a conduit 61 which is connected to a vacuum pump 63, as shown. The pumps 63 and 65 thus maintain the interior of the vapor body 45 at a suitable sub-atmospheric pressure, thereby providing for the evaporation of the liquor fed to the evaporator. In heat exchanger 59 there is means such as a coil of tubing, as diagrammatically shown, into which a further fluid, such as fresh water, is fed from a supply pipe 62 connected to the coil. The vapors released by evaporation condense on said coil and transfer their heat to the now heated fresh water which is discharged from the coil through a pipe 64.

The embodiment of pulp-making system and heat reclaiming system incorporated therein shown in FIG. 2 is the same in its pulp-digesting and blow heat accumulator sections A and B, respectively, as the system of FIG. 1. The elements of such sections of the system are accordingly designated by the same reference characters as in FIG. 1. The blow heat evaporator section of the embodiment of FIG. 2, designated C', differs from section C of FIG. 1 in that a plurality of evaporator effects (multiple effect) are there employed.

Multiple effect operates between the top temperature level of the accumulator system and a low temperature level induced by the condenser and vacuum apparatus at the opposite end of the system. As shown for the purposes of illustration in FIG. 2, that temperature level is the 200° F.± of the accumulator. This is stepped down through the two effects of the evaporator first to 160° F.± in the first effect and to 130° F.± in the second effect. The two effects and temperature differences here shown are merely for the purposes of illustration, it being understood that a greater number of effects employing different temperature differentials may be used.

In section C' of FIG. 2 the first effect 35' has the parts thereof designated by the same reference characters as those employed with the evaporator of FIG. 1 but with an added prime, and the second effect is designated 35" and the parts thereof are designated by the same reference characters as with the evaporator 35 of FIG. 1 but with added double primes. Accordingly, a brief description of the manner of interconnection and functioning of the two effects of section C' will suffice. Hot condensate from accumulator tank 24 is fed to evaporator effect 35' to function as a heating fluid therefor, the now colder heating fluid being returned to a lower cooler zone of the accumulator tank 24 through pipe 33, after transferring its heat across heating surface 37'. Vapors from the vapor body 45' of effect 35' are fed through pipe 43 to the inlet port 34" of effect 35" to function as a heating fluid for such second effect. Such vapors condense on heating surface 37" and the condensate therefrom is exhausted from effect 35" through port 38" to a pump 65 and out of the system through conduit 48. Weak liquor is fed from storage tank 44' by pump 41' into contact with the evaporator heating surfaces 37' and 37" through parallel connected pipes 40' and 40", respectively. Such weak liquor absorbs heat transferred from the hot water across surface 37' and from heat transferred from condensing vapors across surface 37". The weak liquor thereby boils and releases vapors in vapor bodies 45' and 45". Concentrated liquor discharged from the bottom of vapor bodies or hoods 45' and 45" of the two effects is returned by pumps 47' and 47" through pipes 46' and 46", respectively, to the storage tank 44'. As in the system of FIG. 1, valves 50', 52', and 56' are provided whereby liquor forwarded by the pumps 47' and 47" may be fed to the tank 44' or to a discharge pipe 54'. The second effect 35" of the system is provided with an after condenser 66 which is connected to the top of vapor body 45' by a pipe 67. Uncondensed gases are discharged from condenser 66 through a pipe 69, condensed vapors being discharged through a pipe 70.

In FIG. 3 there is shown a pulp-making system incorporating a continuous digester and employing a heat reclaiming system which is somewhat different from that of FIGS. 1 and 2. The digester portion of the system of FIG. 3 is accordingly designated A', and the heat release section of the system is designated B'. The evaporator section C" of such system in its main elements is the same as that of FIG. 2. Accordingly, the same reference characters are employed in section C" for elements of such section which are the same as those in section C' of FIG. 2.

In the system of FIG. 3 there is employed a continuous digester 75 of known construction, such digester being fed by a preliminary mixing unit 72 into which wood chips and steam are fed under pressure. Unit 72 is provided with a gas exhaust and pressure relief means, as indicated. Wood chips and steam are fed under pressure through a conduit diagrammatically shown at 74 into the continuous digester 75 where it is subjected to cooking liquor which is fed into the digester, as indicated. Additional steam under pressure is also fed into the digester at a suitable location, as schematically shown. Digested pulp is continuously removed from the bottom of the digester through a conduit 73 to a pulp washer, the dilute liquor from the pulp washer 19' being forwarded to a liquor storage tank 44' which is connected to the two evaporator effects 35' and 35" in the same manner as in the system of FIG. 2.

Spent cooking liquor is continuously discharged under high pressure from the continuous digester 75 through a pipe 76 into a first, high pressure liquid flash tank 77. In such flash tank, the liquor at the bottom thereof is at a temperature, for example, of 260° F., which, due to the well known phenomenon of boiling point elevation, somewhat exceeds the temperature of the flashed vapors, such as, for example, 255° F., existing at the top of tank 77. Flashed vapors from tank 77 are fed through pipe 85 having a flow controlling valve 85' therein to the mixing unit 72 to supply a portion of the heat required by such unit. Spent liquor is discharged from the bottom of flash tank 77 through a pipe 79 to a second, low pressure liquor flash tank 80. The pressure in tank 77 may be, for example, 18 p.s.i. gauge, whereas the pressure in tank 80 may be, for example sub-atmospheric. Here again, tank 80 will be partially filled with spent liquor having a temperature such as 190° F., whereas flashed vapor in equilibrium with the liquor will be at a somewhat lower temperature, for example 185° F. The spent liquor at the bottom of tank 80 is forwarded to storage tank 44' through a pipe 81 by a pump 82. The flashed vapors from the top of tank 80 are forwarded to the inlet port 34' of the heating circuit for the first effect 35' through a pipe 84. These vapors transfer their heat across the heating surface 37' and condense thereon. This condensate is exhausted from effect 35' through a pipe 33' which is connected to the condensing side of heating surface 37". Vapors from hood 45' are employed as the source of heat for the second effect 35", such vapors being fed to the second effect through pipe 43. These vapors condense on heating surface 37". The condensate therefrom is drained from port 38" of the second effect to the condensate discharge pipe 48, the pump 65 serving to exhaust the condensate from both effects of the system.

In the system of FIG. 3, there is employed a water heating system employing serially connected heat exchangers which are heated by the respective effects 35' and 35". Thus a first heat exchanger 86 which may be of the tube, plate, or coil type is fed with cold water to be heated through a pipe 87. Vapors released from the second effect condense on the heat exchanging surface of the heat exchanger and transfer their heat to the cold water. The now warm water is discharged therefrom through, a pipe 90. Cold water passing through heat exchanger 86 is heated by condensing vapors from the hood or vapor body 45" of the effect 35". Such vapors are fed to the heat exchanger 86 through a pipe 67, and the condensate therefrom is discharged through a pipe 89 connected to the condensate pipe 48. Pipe 90, carrying warm water from heat exchanger 86, is connected to te inlet port of a second heat exchanger 91, hot water flowing from such heat exchanger through pipe 95. Warm water passing through heat exchanger 91 is heated by vapors from the hood 45' of effect 35', a pipe 92 being connected to vapor pipe 43 leading from the first effect to feed vapors to the heat exchanger 91. The vapors condense on the heating surface and transfer their heat to the warm water, condensate from said vapor being discharged from the heat exchanger through a pipe 94 which is connected to the condensate discharge conduit 33'. It will be seen that the water to be heated and the heating vapors for heat exchangers 86 and 91, in effect, flow in countercurrent relationship, that is, the cold water is initially heated by heat from the second lower temperature effect and the warm water is heated by vapors from the first, higher temperature effect. Through this multiple effect heating of water is only shown in conjunction with the FIG. 3 system, it is to be understood that it is equally applicable to the systems of FIGS. 2, 4, and 5.

In FIG. 4 there are shown the heat accumulator section B" and the evaporator section C' of a further embodiment of pulp-cooking system. The portion B" of the system shown may be connected to a digester system such as that shown at A in FIG. 2. The evaporator section C' is the same as that in FIG. 2 and need not be further described. The same reference characters are employed for the parts of such section in FIG. 4 as in FIG. 2.

In section B" the condenser 21 is connected to discharge condensate through conduit 22 through an accumulator tank 24, as in the system of FIG. 2. In section B″, however, water from a hotter zone of the accumulator tank 24 is not discharged directly to the inlet port 34′ of the first evaporator effect 35′. Instead, such hot water is fed through a pipe 97 to a flash tank 96 which is held under a somewhat lower pressure, for example 8.4 p.s.i. absolute, than the pressure of the accumulator tank 24 which in this instance may be held at atmospheric pressure, for example 14.7 p.s.i. absolute. Flash tank 96 contains at its bottom portion cooled water which has been flashed therein to a temperature of, for example, 185° F. (corresponding to 8.4 p.s.i. absolute), from an initial temperature of 200° F. in accumulator tank 24, and the space within tank 96 above the water is filled with said flashed vapors released by the described flashing action within tank 96.

Water from tank 96 is discharged therefrom through a pipe 99 to a pump 27 which forwards to it the condenser 21 through pipe 29 to function as the cooling fluid for such condenser. Flashed vapors in tank 96, at a temperature of, for example, 185° F., are forwarded from the top of the tank through a pipe 100 to the inlet heating port 34 of the first effect 35′ of the blow heat evaporator section C′.

In FIG. 5 there is shown a portion of a pulp-cooking system employing in combination a continuous pulp digester and a heat release section similar to those designated A′ and B′ in FIG. 3 and at least one and preferably a plurality of batch type digesters and heat accumulators therefor. In FIG. 5 only the heat release section B″ for one batch type digester is shown, such accumulator section being similar to that of FIG. 4 and the parts thereof being similarly designated. Sections A′ and B′ of the continuous pulp-cooking system as shown in FIG. 3 and section B″ of the one or more batch type digesters are associated with and connected to an evaporator section C′ which is the same as that of FIG. 4.

As shown, flashed vapors from the second, low pressure flash tank 80 of section B′ of the heat release section of the continuous pulp digester are fed through a pipe 104 which is connected to the pipe 100 which feeds flashed vapors from the accumulator tank 96 of section B″ to the inlet heating port 34′ of the first evaporator effect. Particularly when a plurality of intermittently discharged batch type digesters are used, the flashed vapors from such batch type digesters advantageously supplements the continuously discharged vapors from the continuous digester.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus the temperatures shown on various units in the drawings are given only for purposes of illustration and not by way of limitation.

What is claimed is:

1. A heat reclaiming and evaporating apparatus for use in a pulp-cooking system having a pressure type pulp digester for reducing wood chips to pulp and from which digested pulp and hot spent cooking liquor are discharged at an elevated temperature, which comprises an evaporator of the heated surface type, means for collecting a heated fluid which is wholly derived from said spent cooking liquor, means for forwarding said heated fluid directly to said evaporator to serve as at least the predominant source of heating fluid for the evaporator, and means for introducting spent cooking liquor derived from the pulp digester of the pulp-cooking system into the evaporator in heat exchanging relationship with said heating fluid.

2. Apparatus as claimed in claim 1, wherein the heating fluid is a vapor which is wholly derived from the hot fluid in the collecting means, and the heating vapor in passing through the evaporator condenses to a liquid.

3. Apparatus as claimed in claim 1, wherein the system includes a receiver into which digested pulp and spent aqueous cooking liquor are discharged from the digester and from which flashed water vapor is discharged, and comprising a condenser connected to be fed with such flashed vapors, said heated surface type evaporator being connected to receive fluid functioning as a source of heat for the evaporator from the hot zone of the accumulator tank and to discharge such liquid to the cooler zone of the acccumulator tank, a flash tank, means to feed condensate from said first, hot upper zone of the accumulator tank to the flash tank, means for feeding vapor from the flash tank to the evaporator, said vapor functioning as the sole source of heat for the evaporator.

4. Apparatus as claimed in claim 1, wherein the system includes a receiver into which spent aqueous cooking liquor is discharged from the digester and from which said spent liquor is discharged, and comprising a flash tank conected to receive such spent liquor from the receiver, such flash tank being maintained under an appreciably lower pressure whereby to cause a portion of the spent liquor in such tank to flash to water vapor, means to discharge spent liquor from the flash tank, said heated surface type evaporator being connected to receive said flashed water vapor from the flash tank.

5. Apparatus as claimed in claim 1, wherein the pulp digester operates continuously and continuously discharges spent cooking liquor at elevated temperature under high pressure, and comprising a flash tank connected to receive such spent liquor, such flash tank being maintained under an appreciably lower pressure than the pulp digester whereby to cause a portion of the spent liquor in such flash tank to flash to vapors, means to discharge spent liquor from the flash tank, said heated surface type evaporator being connected to receive said flashed water vapor from the flash tank, and means for introducing spent cooking liquor derived from the pulp digester of the pulp-cooking system into the evaporator in heat exchanging relationship with the said flashed water vapor in the evaporator.

6. A method of reclaiming heat from a pulp-cooking system having a presure type pulp digester from which digested pulp and spent cooking liquor are discharged at an elevated temperature, comprising collecting a heated fluid which is wholly derived from said spent cooking liquor and forwarding said heated fluid to an evaporator of the heated surface type to serve as at least the predominant source of heating fluid for the evaporator, and introducing spent cooking liquor derived from the pulp digester of the pulp-cooking system into the evaporator in heat exchanging relationship with the said heating fluid.

7. A method as claimed in claim 6, comprising forwarding the collected heated fluid directly to the evaporator.

8. A method as claimed in claim 7, wherein the heating fluid for the evaporator is a vapor which is wholly derived from the collected hot fluid, and the heating vapor in passing through the evaporator condenses to a liquid.

9. A method as claimed in claim 8, comprising collecting said digested pulp and spent aqueous cooking liquor, flashing water vapor from said collected cooking liquor, feeding said water vapor to a condenser, accumulating condensate from said condenser in a pool wherein the upper zone of the condensate is at a temperature which is markedly higher than the lower zone thereof, feeding liquid from the hotter zone of said pool to said evaporator to function as at the predominant source of heat therefor, and discharging such liquid from the evaporator to said cooler zone of said pool.

10. A system having a tank having a liquid therein with the liquid at a marked temperature differential between the liquid at a first, relatively cool zone and a second, relatively hot zone therein appreciably spaced from each other, a condenser, means to feed a heated vapor to the condenser, means to feed liquid as a cooling liquid from the first, relatively cool zone thereof in the tank into the condenser in heat exchanging relationship with the heated vapor therein, means to discharge the resulting condensed vapor from the condenser into the second, hotter zone of the liquid in the tank, an evaporator connected to receive liquid functioning as a source of heat for the evaporator from a hot zone of the tank and to discharge such liquid to another markedly cooler zone of the tank, and means for introducing a process liquid into the evaporator in heat exchanging relationship with said heating liquid in the evaporator.

11. A method of utilizing the heat of a body of liquid having a marked temperature differential between the liquid at first, a relatively cool zone and a second, relatively hot zone therein appreciably spaced from each other, comprising feeding a heated vapor to a condenser, feeding liquid as a cooling liquid from the first, relatively cool zone in the body of liquid into the condenser in heat exchanging relationship with the heated vapor discharging the resulting condensed vapor from the condenser into the second, hotter zone of the body of liquid, providing a heated surface type evaporator connected to receive liquid functioning as a source of heat to an evaporator from the second, hot zone of the body of liquid and to discharge such liquid to the first, markedly cooler zone of the body of liquid, and introducing a process liquid into the evaporator in heat exchanging relationship with said heating liquid in the evaporator.

12. A method as claimed in claim 11, comprising collecting vapors evaporated from the process liquid in the evaporator, and transferring heat across a heat exchanger from the vapors collected from the process liquid in the evaporator, and circulating a fluid to be heated through the heat exchanger in heat exchanging relationship with but separate from the said heating vapors in the heat exchanger.

13. A system having a vessel from which flashed vapors are discharged, a condenser connected to be fed with such flashed vapors, an accumulator tank receiving condensate issuing from said condenser formed from the condensing of said vapors, said accumulator being of such character as to hold the condensate therein with the condensate at a marked temperature differential between the condensate at an upper hot zone and a lower cool zone, means to feed condensate from said cool zone of the accumulator as a cooling liquid to said condenser, means to return said cooling liquid after being heated in said condenser to said accumulator to form said hot zone therein, a heated surface type evaporator connected to receive liquid functioning as a source of heat for the evaporator from said hot zone of the accumulator tank, means to return such liquid to said cool zone of said accumulator tank after having released its heat to process liquid being boiled in said evaporator, means for introducing said process liquid into the evaporator in heat exchange relationship with said liquid from said hot zone of the accumulator, a heat exchanger, means to collect vapors released by evaporation of said process liquid in the evaporator and to introduce such vapors to the heat exchanger as a source of heat therefor, and means to circulate a fluid to be heated through the heat exchanger in heat exchange relationship with, but separated from, the said heating fluid in the heat exchanger.

14. A system having a vessel from which flashed vapors are discharged, a condenser to be fed with such flashed vapors, means receiving condensate issuing from said condenser formed from the condensing of said vapors, means to feed a cooling liquid to the condenser, a heated surface type evaporator connected to receive liquid functioning as a source of heat for the evaporator from said condensate receiving means, means to discharge such liquid from the evaporator after having released its heat to process liquid being boiled in said evaporator, means for introducing said process liquid into the evaporator in heat exchange relationship with said liquid from said condensate receiving means, a heat exchanger, means to collect vapors released by evaporation of said process liquid in the evaporator and to introduce such vapors to the heat exchanger as a source of heat therefor, and means to circulate a fluid to be heated through the heat exchanger in heat exchange relationship with, but separated from, the said heating fluid in the heat exchanger.

15. A pulp-cooking system having in combination a continuous pulp digester and a batch type pulp digester, the continuous pulp digester continuously discharging digested pulp and spent aqueous cooking liquor at an elevated temperature and at high pressure, the batch type digester intermittently discharging digested pulp, spent cooking liquor, and flashed vapor therefrom, a first flash tank connected to receive spent liquor from the continuous digester, such first flash tank being maintained under an appreciably lower pressure than that existing in the continuous digester whereby to cause a portion of the spent liquor in such tank to flash to water vapor, means to discharge spent liquor from said first flash tank, a condenser connected to be fed with flashed vapors discharged from the batch type digester, an accumulator tank receiving condensate from said vapors issuing from the condenser, said accumulator being of such character as to hold the condensate therein with the condensate at a marked temperature differential between the condensate at a first, upper hotter zone and a second, lower cooler zone therein, a second flash tank, means to feed condensate from a first, relatively hot zone thereof in the accumulator tank to the second flash tank, a heated surface type evaporator connected to receive vapors from the first and second flash tanks, said vapors functioning as a source of heat for the evaporator, and means for introducing spent cooking liquor derived from the pulp digesters of the pulp-cooking system into the evaporator in heat exchanging relationship with the said flashed vapors in the evaporator.

References Cited by the Examiner

UNITED STATES PATENTS

| | | | |
|---|---|---|---|
| 1,799,478 | 4/1931 | Peebles | 159—2 |
| 1,908,615 | 5/1933 | Oman | 162—47 |
| 2,676,883 | 4/1954 | Goddard | 92—2 |
| 2,770,295 | 11/1956 | Allen | 159—47 X |
| 2,839,122 | 6/1958 | Laguilharre | 159—46 X |
| 3,183,145 | 5/1965 | Collins | 162—47 |

FOREIGN PATENTS

| | | |
|---|---|---|
| 228,137 | 6/1963 | Austria. |
| 1,075,251 | 10/1954 | France. |

NORMAN YUDKOFF, *Primary Examiner.*

J. SOFER, *Assistant Examiner.*